Dec. 2, 1930.  A. F. SHEPARD  1,783,589
MEANS FOR CONVERTING ROTARY INTO RECIPROCATING
MOTION AND VICE VERSA
Filed June 14, 1928  7 Sheets-Sheet 6

Dec. 2, 1930.        A. F. SHEPARD        1,783,589
  MEANS FOR CONVERTING ROTARY INTO RECIPROCATING
               MOTION AND VICE VERSA
          Filed June 14, 1926    7 Sheets-Sheet 7

INVENTOR
Alban Francis Shepard
BY B. Singer
ATTORNEY

Patented Dec. 2, 1930

1,783,589

UNITED STATES PATENT OFFICE

ALBAN FRANCIS SHEPARD, OF RICHMOND, ENGLAND

MEANS FOR CONVERTING ROTARY INTO RECIPROCATING MOTION AND VICE VERSA

Application filed June 14, 1928, Serial No. 285,474, and in Great Britain June 17, 1927.

This invention relates to improvements in or connected with means for converting rotary into reciprocating motion and vice versa and has for its object to provide a converter of great simplicity and efficiency.

According to this invention I provide one or more rotary units having one or more eccentric circular guideways therein each being adapted to co-operate with one or more slippers carried on or by members hereinafter referred to as cross-heads, said cross-heads being restrained in straight paths. It is thus apparent that as said unit or units revolve each slipper traces the path of the corresponding guideway and imparts a reciprocating motion to the associated cross-head, and conversely, if one or more of the cross-heads have reciprocating motion imparted thereto, the paths of the guideways are again traversed and the unit or units carrying the same is or are rotated.

If desired, a plurality of circular guideways may be so arranged on the rotary unit or units and so associated with slippers and cross-heads that a perfect balance of the reciprocating parts is effected, and the invention is therefore specially applicable to high speed engines, such for example as engines for aero work.

In one form of device according to this invention I provide two similar discs having one or more eccentric circular grooves cut therein, the said discs being disposed so that the grooves in one are opposite those in the other, and into each of said pairs of grooves is fitted an arcuate slipper which is pivoted to a cross-head slidably retained in a straight groove or slot cut in a stationary circular plate or guide disc located between the two said discs. If for example there are three eccentric circular grooves spaced at 120° and three straight guides or grooves radially disposed with respect to the discs, reciprocating motion will be imparted to the cross-heads restrained in such guides through the medium of the slippers, and the equivalent of a three-cylinder radial-cylinder engine mechanism is obtained.

The before mentioned arcuate slippers must be sufficiently long to bridge the gaps in their guideways caused by intersection of two or more of them in cases where such intersections take place.

In modified forms of the above example it is apparent that there may be a greater or less number of guideways and more than one slipper and corresponding cross-head may be associated with each of said guideways, it is also obvious that instead of forming these guideways and those for the cross-heads by grooves cut in the discs they may be formed by raised channels or rails.

If desired, the before mentioned guides in which the cross-heads slide may be arranged in an off-set position, i. e. not radially with respect to the disc.

The above mentioned cross-head may be directly attached to the piston rods of an engine or motor, the corresponding cylinder being integral with or forming the guide disc.

I append drawings illustrating my invention as carried into effect in a few forms.

In carrying the invention into effect, in order to obtain good balance of the moving parts, the mechanism is preferably made of symmetrical structure relative to a middle plane at right angles to the axis of rotation. For this purpose, either the rotary or the stationary guide member is located at said plane, and the other guide member is made in duplicate, the two similar parts thereof being located on opposite sides of said plane.

Figure 1:
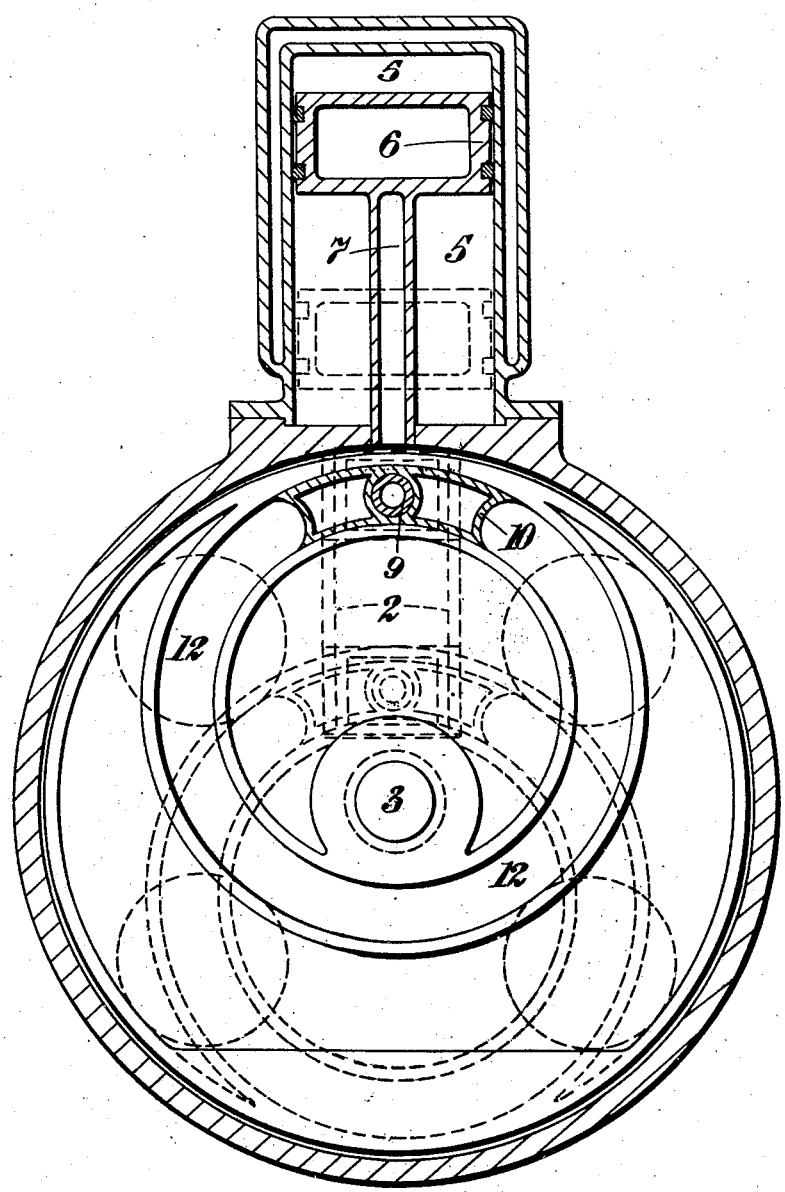
Figure 1 is a transverse section illustrating the device as applied to a single-cylinder engine.
Figure 2:
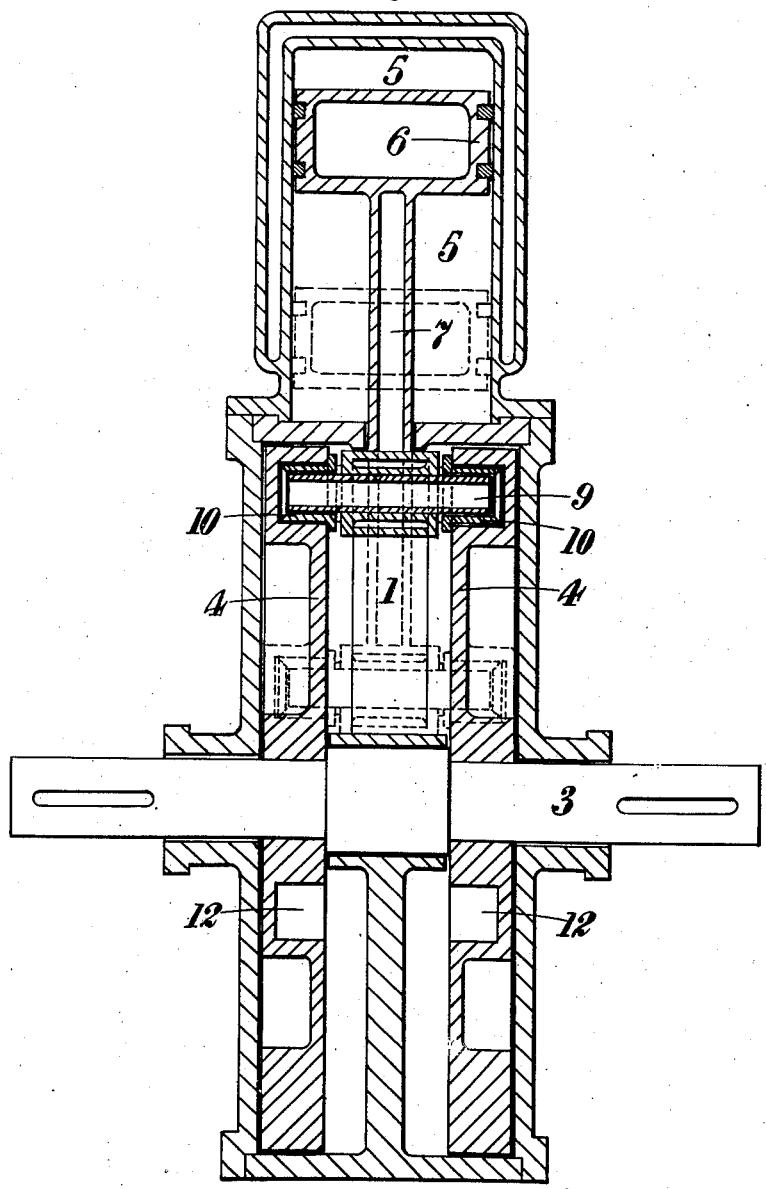
Figure 2 is a longitudinal section.

In Figures 1 and 2, the fixed guide member 1, with its straight guideway 2, is centrally situated and the rotary shaft 3 has the two duplicate rotary guide members or rotors 4 fastened thereto. The axis of the cylinder 5 is in the middle plane of the fixed guide member. The piston 6 is connected by a piston rod 7 to the cross-head 8, which slides in the guide-way 2. A cross-head pin 9 is fastened to and projects from the cross-head on opposite sides thereof. Slippers 10 are pivoted on the ends of the cross-head pin, and are adapted to slide in the grooves or guideways 12 of the rotors 4.

Figure 3:
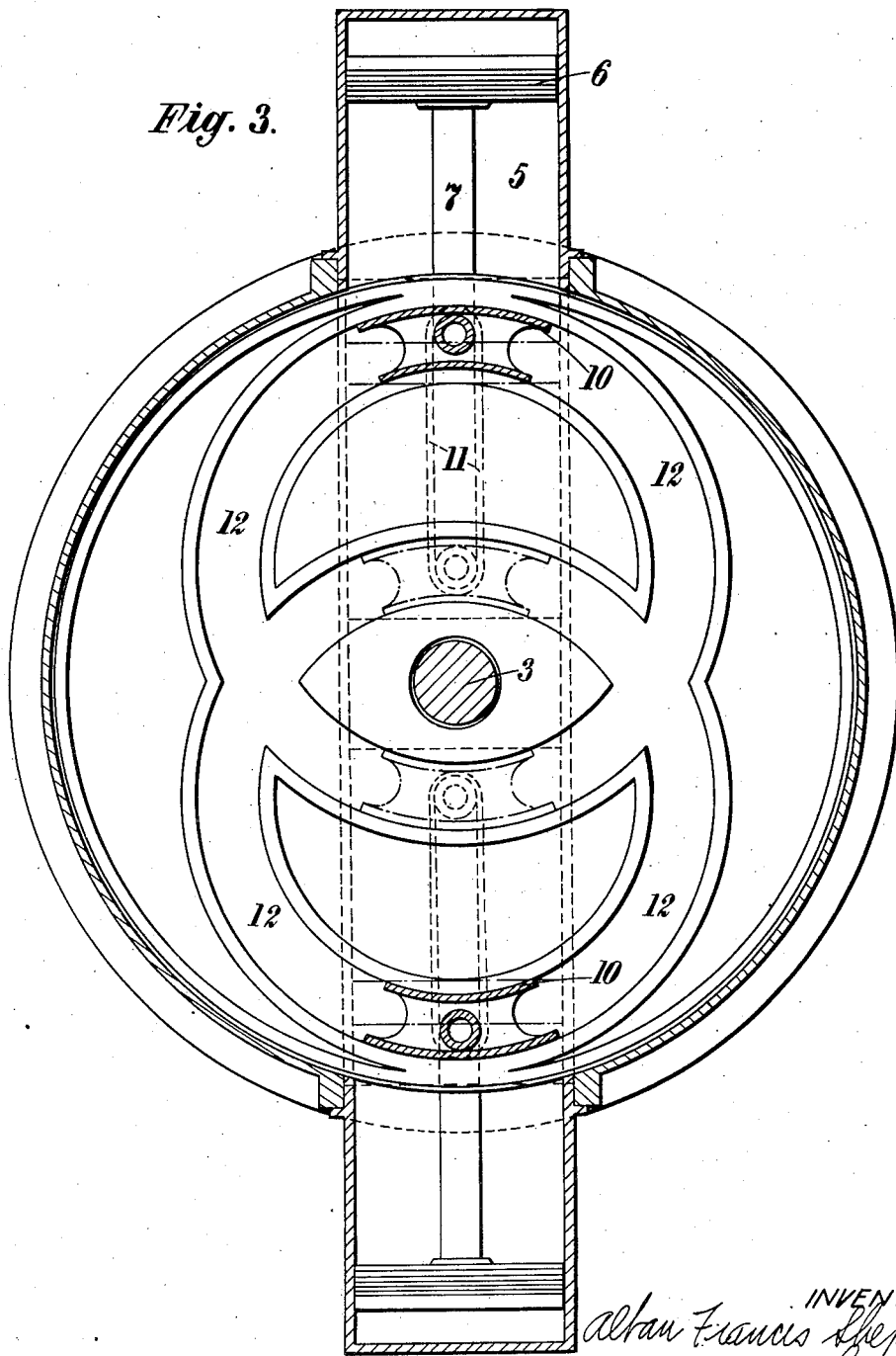
Figures 3 and 4 are similar views showing the device as applied to an engine with two opposed cylinders.
Figure 4:
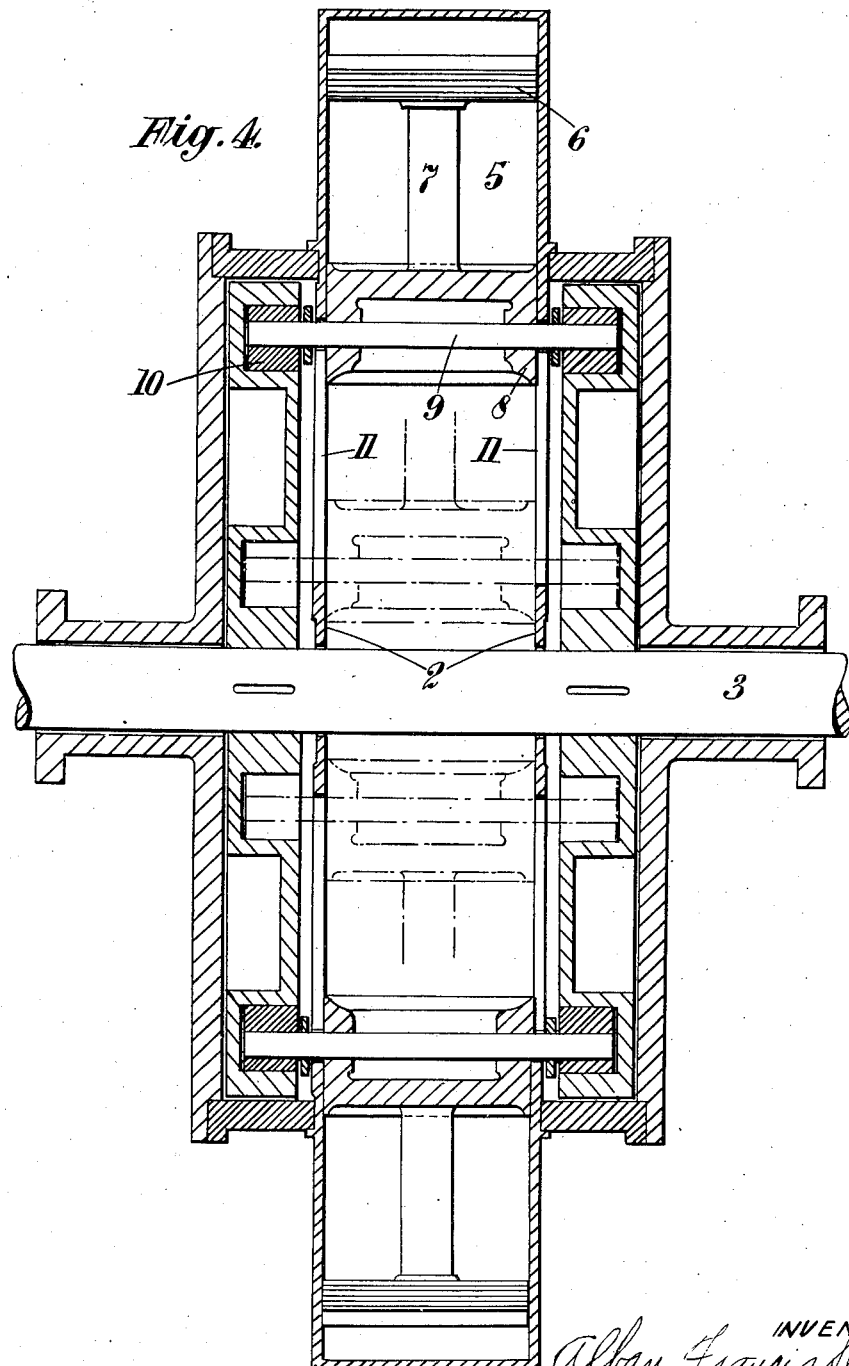

In Figures 3 and 4 the straight guideway 2 for each cross-head 8 is formed by an extension of the cylinder walls and the cross-head is of the same diameter as the piston. The guideway is slotted at 11 to permit the cross-head pin 9 to project through. Two eccentric circular guideways 12 are formed in each rotor 4, their centres being at equal distance from the centre of the shaft 3. The arrangement of the slippers 10, in relation to the cross-heads, cross-head pins and guideways 12, is similar to that hereinbefore described with reference to Figures 1 and 2. The mechanism comprises in effect two similar independent mechanisms with a rotary shaft common to both, the two rotor guideways being at 180° phase difference. The two cylinders being in line, the two pistons therefore move at any instant in opposite directions with the same velocity. The inertia forces of the reciprocating masses are balanced, providing the oppositely moving masses are equal.

Figure 5:
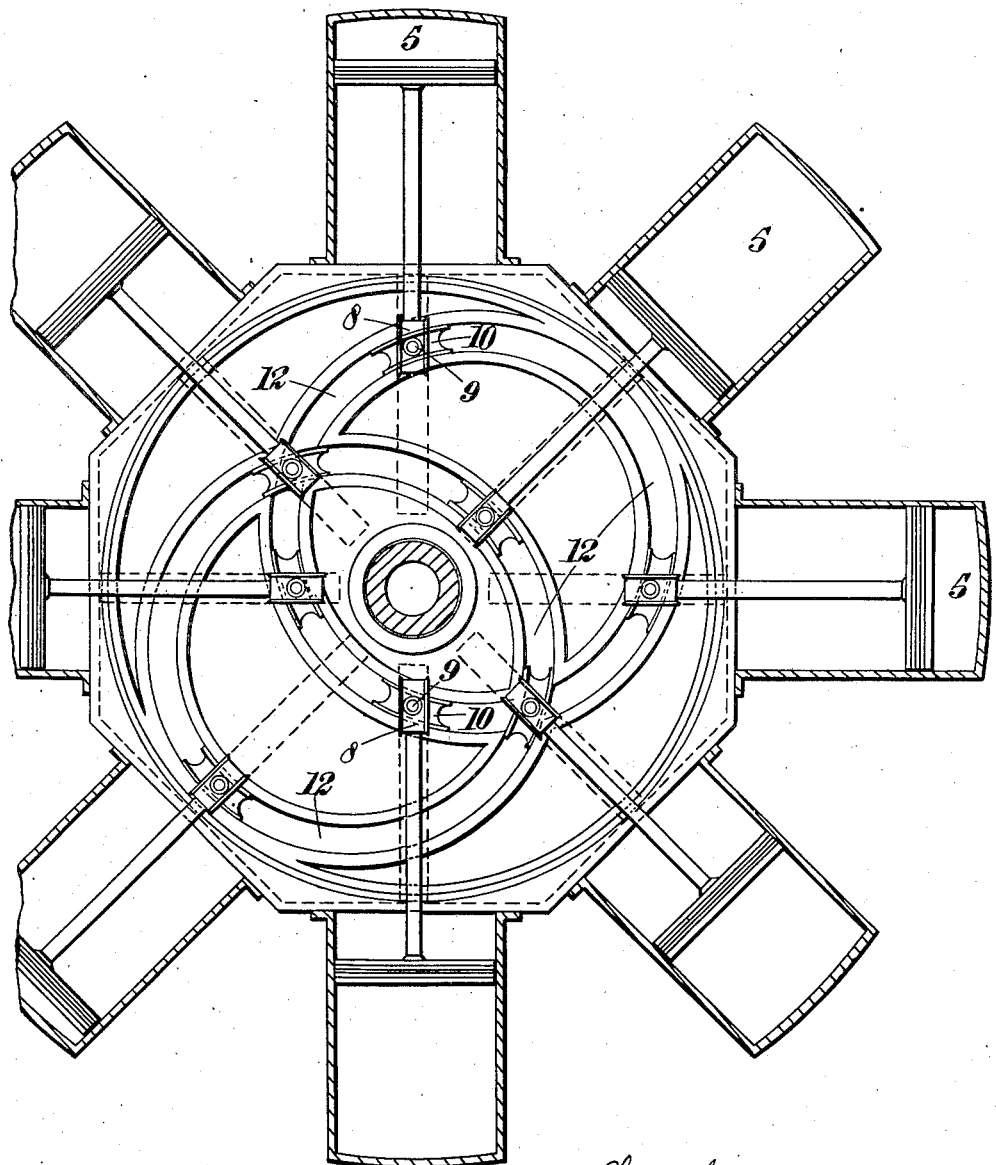
Figures 5 and 6 are similar views of a cylinder engine with eight cylinders made according to my invention.
Figure 6:
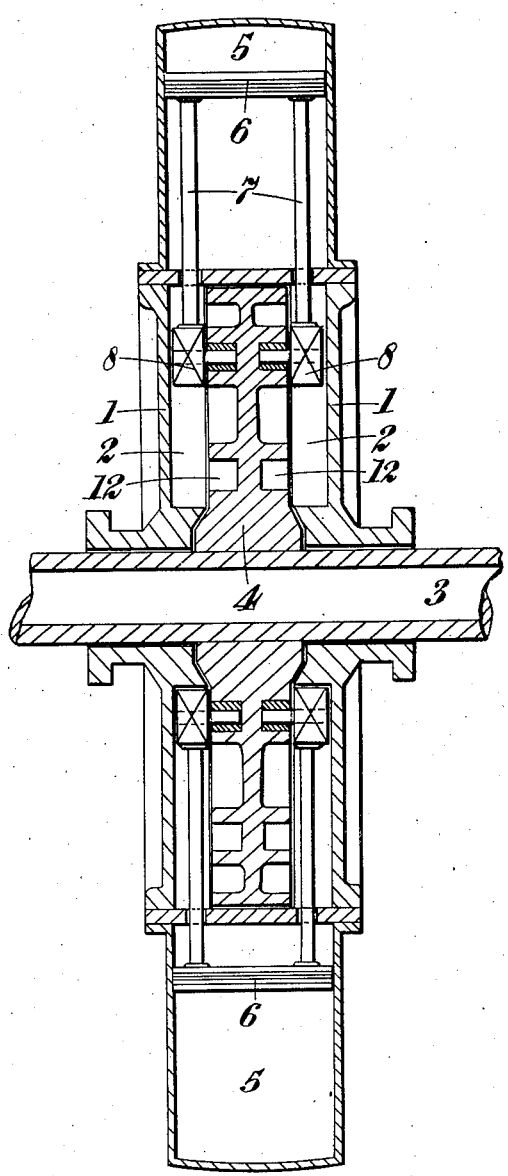

In Figures 5 and 6, the symmetrical arrangement of the fixed and rotary guideway members is converse of that shown in Figs. 1-4, the rotor 4 being centrally located in the plane of the axes of the cylinders 5, and the fixed straight guide-ways 2 being in duplicate on the opposite faces of the central casing. Each piston 6 is connected to a pair of corresponding cross-heads 8 by two piston rods 7. In this example the rotor 4 has two sets of circular guideways 12 in duplicate on its opposite faces, in which the slippers 10 engage. The rotor is kinematically similar to that shown in Figures 3 and 4 although structurally different. Otherwise the arrangement of the slippers in relation to the cross-heads and guideways is similar to that hereinbefore described. With each of the two guideways of the rotor, four pairs of slippers engage, as is clearly shown in Figure 5. The eight cylinders being arranged at equal angular intervals, the working impulses in the various cylinders occur at equal time intervals, and the turning moment on the rotary shaft is as nearly uniform as is possible. The reciprocating masses are mutually balanced, if the usual well known conditions are satisfied.

Figure 7:
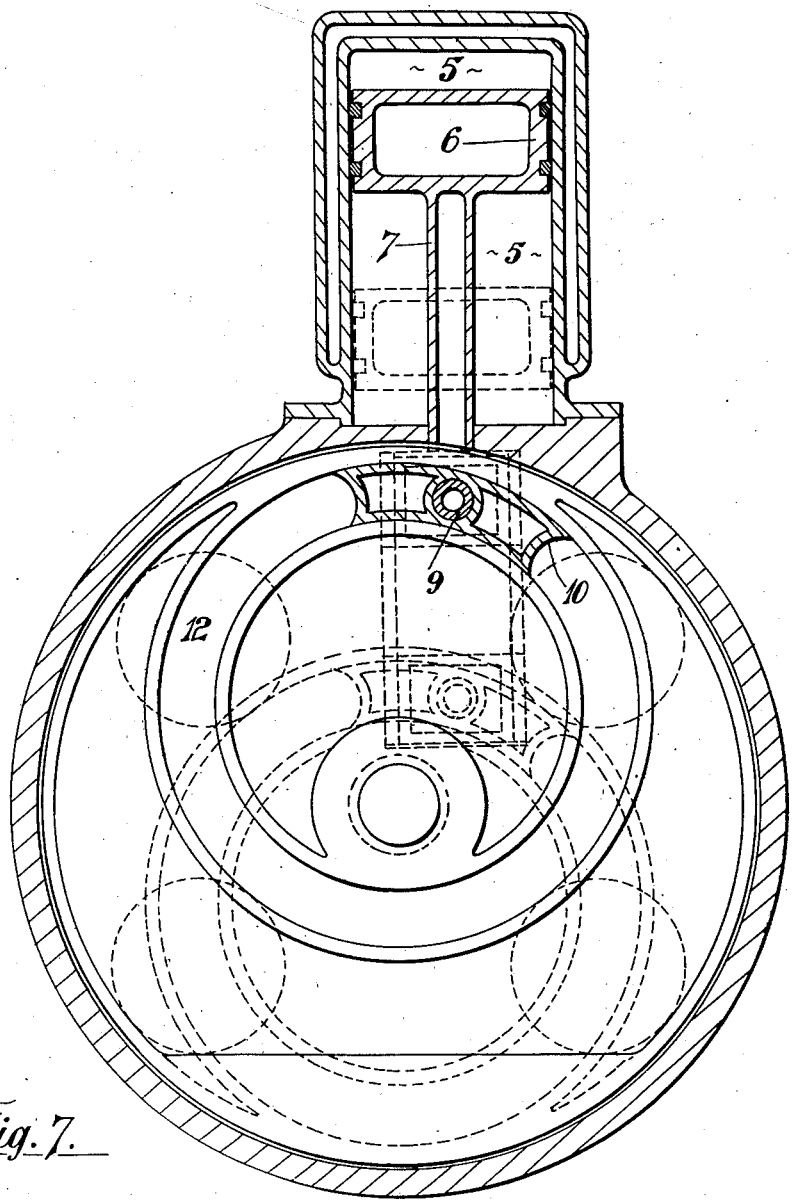
Figure 7 is a vertical sectional view of an engine constructed in accordance with a modification of my invention.

Figure 7 shows a simple construction by means of which positions of dead-center may be avoided in an engine according to my invention. The engine illustrated is very similar to that shown in Figure 1, the essential difference being that the cylinder 5 with its piston 6 and connecting rod 7 are moved off-center and the reactionary guide 2 is correspondingly moved. The illustration shows the piston 6 at the top of its stroke and in this position it is apparent that the slipper 10 is not in a position housed in the groove 12 of dead-center but is ready to impart to the shaft 3 a turning movement as soon as there is any thrust in the rod 7.

It is obvious from the examples described that my invention can be applied to radial-cylinder engines, compressors, pumps and the like with other numbers of cylinders. For example, a three-cylinder engine may have a single circular guideway on its rotor, with which the three pairs of cylinders all engage. A six-cylinder engine may have two guideways on its rotor, with each of which three pairs of slippers engage. A twelve-cylinder engine may have a rotor with three guideways each with four pairs of slippers engaging therewith.

It is to be observed that my invention is equally applicable to rotating-cylinder engines. Thus, in Figures 5 and 6 if the shaft be fixed, the rotor 4 becomes stationary, and the cylinders and other parts in fixed relationship thereto revolve, the relative motion being unaltered. Provision is made for the inlet and discharge of the fluid to and from the cylinders by way of the hollow fixed shaft 3, but this does not form any part of my present invention.

Friction between the slippers and guides may be reduced by any suitable means, such for example as by white metal insets, and the reciprocation of the cross-head in its guide may be utilized for delivering oil to the working parts. In order to promote efficient lubrication of the inner surface of the guideways, the slippers preferably have concaved ends whereby, as the oil is swung round on the outside of said guides by centrifugal action, it meets said concaved surfaces and is swirled on to the inner surface thereof.

Whilst several embodiments of my invention have been above described by way of example, it is apparent that the specific details may be varied and modified without departing from the scope thereof.

I claim:

1. An engine, pump or the like, consisting of an assembly of symmetrical structure relative to a middle plane at right angles to the axis of rotation of the rotary parts and comprising in combination a pair of disc-like members each having an eccentric circular guideway therein, a reactionary member incorporating a straight guideway disposed in between said disc-like members, said disc-like members and said reactionary member being arranged for relative rotation, a cross head restrained in the said straight guideway and an arcuate slipper disposed in each eccentric circular guideway and pivoted to said cross head.

2. An engine, pump or the like consisting of an assembly of symmetrical structure relative to a middle plane at right angles to the axis of rotation of the rotary parts and comprising in combination, a pair of disc-like members each having a plurality of eccentric circular guideways therein, a reactionary member between said disc-like members, and incorporating a straight guideway, said disc-like members and said reactionary member being arranged for relative rotation, a cross head restrained in the straight guideway and an arcuate slipper arranged in the eccentric circular guideways and pivoted to the cross head.

3. An engine, pump or the like, consisting of an assembly of symmetrical structure relative to a middle plane at right angles to the axis of rotation of the rotary parts, and comprising in combination a pair of disc-like members each having an eccentric circular guideway therein, a reactionary member incorporating a straight guideway disposed in between said disc-like members, said disc-like members and said reactionary member being arranged for relative rotation, a cross head restrained in the straight guideway and a plurality of arcuate slippers arranged in the eccentric circular guideways and each pivoted to the cross head.

4. An engine, pump or the like consisting of an assembly of symmetrical structure relative to a middle plane at right angles to the axis of rotation of the rotary parts and comprising in combination a pair of disc-like members each having a plurality of eccentric circular guideways therein, a reactionary member between said disc-like members and having a straight guideway, said disc-like members and said reactionary member being arranged for relative rotation, a cross head restrained in the straight guideway and a plurality of arcuate slippers arranged in each eccentric circular guideway and each pivoted to the cross head.

In witness whereof I affix my signature.

ALBAN FRANCIS SHEPARD.